(12) United States Patent
Matusov et al.

(10) Patent No.: US 11,783,197 B2
(45) Date of Patent: Oct. 10, 2023

(54) USING META-INFORMATION IN NEURAL MACHINE TRANSLATION

(71) Applicant: eBay Inc., San Jose, CA (US)

(72) Inventors: Evgeny Matusov, Aachen (DE);
Wenhu Chen, Shaoguan Shi (CN);
Shahram Khadivi, Aachen (DE)

(73) Assignee: EBAY INC., San Jose, CA (US)

( * ) Notice: Subject to any disclaimer, the term of this patent is extended or adjusted under 35 U.S.C. 154(b) by 29 days.

(21) Appl. No.: 17/529,032

(22) Filed: Nov. 17, 2021

(65) Prior Publication Data

US 2022/0076132 A1 Mar. 10, 2022

Related U.S. Application Data

(63) Continuation of application No. 15/584,482, filed on May 2, 2017, now Pat. No. 11,238,348.

(Continued)

(51) Int. Cl.
 *G06N 3/08* (2023.01)
 *G06N 3/04* (2023.01)
(Continued)

(52) U.S. Cl.
 CPC ......... *G06N 3/086* (2013.01); *G06F 16/1794* (2019.01); *G06F 16/30* (2019.01);
(Continued)

(58) Field of Classification Search
 CPC ........ G06N 3/044; G06N 3/086; G06N 3/045; G06N 20/00; G06F 16/1794;
(Continued)

(56) References Cited

U.S. PATENT DOCUMENTS

| 5,504,675 A | 4/1996 | Cragun et al. |
|---|---|---|
| 5,774,868 A | 6/1998 | Cragun et al. |
| (Continued) | | |

FOREIGN PATENT DOCUMENTS

| CN | 101233559 A | 7/2008 |
|---|---|---|
| JP | 2015-170094 A | 9/2015 |
| (Continued) | | |

OTHER PUBLICATIONS

Notice of Allowance received for Korean Patent Application No. 10-2018-7035351, dated Oct. 16, 2020, 3 pages (2 pages of official copy & 1 page of English translation).

(Continued)

*Primary Examiner* — Etienne P Leroux
(74) *Attorney, Agent, or Firm* — SCHWEGMAN LUNDBERG & WOESSNER, P.A.

(57) ABSTRACT

Systems and methods for neural machine translation are provided. In one example, a neural machine translation system translates text and comprises processors and a memory storing instructions that, when executed by at least one processor among the processors, cause the system to perform operations comprising, at least, obtaining a text as an input to a neural network system, supplementing the input text with meta information as an extra input to the neural network system, and delivering an output of the neural network system to a user as a translation of the input text, leveraging the meta information for translation.

20 Claims, 9 Drawing Sheets

Related U.S. Application Data

(60) Provisional application No. 62/332,608, filed on May 6, 2016.

(51) Int. Cl.
*G06N 20/00* (2019.01)
*G06F 40/30* (2020.01)
*G06F 40/58* (2020.01)
*G06F 16/30* (2019.01)
*G06F 16/178* (2019.01)
*G06F 16/9535* (2019.01)
*G06N 3/086* (2023.01)
*G06N 3/044* (2023.01)
*G06N 3/045* (2023.01)
*G06F 16/00* (2019.01)

(52) U.S. Cl.
CPC .......... *G06F 16/9535* (2019.01); *G06F 40/30* (2020.01); *G06F 40/58* (2020.01); *G06N 3/044* (2023.01); *G06N 3/045* (2023.01); *G06N 20/00* (2019.01); *G06F 16/00* (2019.01)

(58) Field of Classification Search
CPC ...... G06F 16/9535; G06F 16/30; G06F 16/00; G06F 40/30; G06F 40/58
See application file for complete search history.

(56) References Cited

U.S. PATENT DOCUMENTS

| | | | |
|---|---|---|---|
| 6,182,026 B1* | 1/2001 | Tillmann | G06F 40/42 704/256.1 |
| 6,219,646 B1 | 4/2001 | Cherny | |
| 6,604,101 B1 | 8/2003 | Chan et al. | |
| 9,684,653 B1 | 6/2017 | Bhagat | |
| 9,875,258 B1 | 1/2018 | Hsiao et al. | |
| 10,032,463 B1 | 7/2018 | Rastrow et al. | |
| 10,268,684 B1 | 4/2019 | Denkowski et al. | |
| 2002/0055833 A1 | 5/2002 | Sterling | |
| 2002/0138455 A1 | 9/2002 | Abdel-moneim | |
| 2004/0230898 A1 | 11/2004 | Blakely et al. | |
| 2005/0086214 A1 | 4/2005 | Seewald et al. | |
| 2006/0293893 A1 | 12/2006 | Horvitz | |
| 2007/0027908 A1* | 2/2007 | Lang | G06F 40/47 |
| 2007/0094268 A1 | 4/2007 | Tabe | |
| 2010/0262575 A1* | 10/2010 | Moore | G06F 17/18 706/59 |
| 2011/0248914 A1* | 10/2011 | Sherr | G06F 3/0237 345/156 |
| 2012/0173223 A1 | 7/2012 | Liu | |
| 2014/0229158 A1 | 8/2014 | Zweig et al. | |
| 2014/0289182 A1 | 9/2014 | Ramakrishnan et al. | |
| 2014/0358631 A1* | 12/2014 | Ghose | G06Q 30/0201 705/7.29 |
| 2016/0117316 A1 | 4/2016 | Le et al. | |
| 2016/0253746 A1 | 9/2016 | Morrison | |
| 2016/0352656 A1 | 12/2016 | Galley et al. | |
| 2017/0323203 A1 | 11/2017 | Matusov et al. | |
| 2018/0137106 A1* | 5/2018 | Platek | G06F 5/00 |

FOREIGN PATENT DOCUMENTS

| | | |
|---|---|---|
| KR | 10-2001-0008391 A | 2/2001 |
| KR | 10-2008-0053771 A | 6/2008 |
| KR | 10-2011-0032394 A | 3/2011 |
| WO | 2017/192522 A1 | 11/2017 |

OTHER PUBLICATIONS

Office Action received for Korean Patent Application No. 10-2018-7035351, dated Feb. 17, 2020, 10 pages (5 pages of official copy and 5 pages of English translation).
Office Action received for Korean Patent Application No. 10-2021-7001615, dated Apr. 26, 2021, 5 pages (1 page of English translation & 4 pages of official copy).
International Written Opinion received for PCT Patent Application No. PCT/US2017/030552, dated Jul. 13, 2017, 9 pages.
International Search Report received for PCT Patent Application No. PCT/US2017/030552, dated Jul. 13, 2017, 2 pages.
International Preliminary Report on Patentability received for PCT Application No. PCT/US17/30552, dated Nov. 15, 2018, 11 pages.
Lee et al., "Character-Level Neural Machine Translation", Proceedings of the 27th Korean and Korean Information Processing Conference, 2015, 8 pages.
Bahdanau et al., "Neural Machine Translation by Jointly Learning to Align and Translate", Published as a conference paper at ICLR, Retrieved from the Internet URL: <https://arxiv.org/pdf/1409.0473.pdf>, 2015, 15 pages.
Office Action Received for Korean Patent Application No. 10-2022-7002797, dated Feb. 15, 2022, (1 page translation, 3 pages official copy) 4 pages.
Advisory Action received for U.S. Appl. No. 15/584,482, dated Mar. 9, 2021, 3 pages.
Final Office Action received for U.S. Appl. No. 15/584,482 dated Jan. 1, 2021, 17 pages.
Final Office Action received for U.S. Appl. No. 15/584,482, dated Aug. 2, 2021, 25 pages.
Final Office Action received for U.S. Appl. No. 15/584,482, dated Jul. 13, 2020, 22 pages.
First Action Interview Office Action Summary received for U.S. Appl. No. 15/584,482, dated May 1, 2020, 3 pages.
First Action Interview Pre-Interview Communication received for U.S. Appl. No. 15/584,482, dated Feb. 14, 2020, 5 pages.
Non Final Office Action received for U.S. Appl. No. 15/584,482, dated Apr. 12, 2021, 25 pages.
Non Final Office Action received for U.S. Appl. No. 15/584,482, dated Sep. 22, 2020, 16 pages.
Notice of Allowance received for U.S. Appl. No. 15/584,482, dated Oct. 6, 2021, 8 pages.
Notice of Allowance received for Korean Patent Application No. 10-2022-7002797, dated Aug. 1, 2022, 3 pages (1 page of English Translation & 2 Pages Of Official Copy).
Office Action received for Chinese Patent Application No. 201780028072.9 dated Dec. 1, 2022, 7 Pages. (1 Page of English Translation & 6 pages of official Copy).

* cited by examiner

| DATA-SET | | TED TALK | | E-COMMERCE | |
|---|---|---|---|---|---|
| LANGUAGE | | GERMAN | ENGLISH | GERMAN | ENGLISH |
| TRAINING | SENTENCES | 165201 | | 516000 | |
| | RUNNING WORDS | 3873816 | 3656038 | 2592202 | 2895089 |
| | FULL VOCABULARY | 103390 | 45068 | 119607 | 129848 |
| DEV | SENTENCES | 567 | | 910 | |
| | RUNNING WORDS | 9812 | 10695 | 10339 | 11283 |
| TEST | SENTENCES | 1100 | | 910 | |
| | RUNNING WORDS | 19019 | 22895 | 10817 | 11016 |
| SOURCE OOV RATE % W.R.T. FULL/NMT VOCABULARY | | 5.16/6.12 | | 2.56/5.76 | |

FIG. 8

| E-COMMERCE En → Fr | BLEU % | TER % |
|---|---|---|
| BASELINE NMT | 18.6 | 68.5 |
| +PREFIXED HUMAN-LABELED CATEGS | 18.3 | 69.3 |
| +READOUT HUMAN-LABELED CATEGS | 19.7 | 65.3 |
| +READOUT LDA TOPICS | 14.5 | 74.9 |

FIG. 9

| | |
|---|---|
| SOURCE | ICH MÖCHTE IHNEN HEUTE MORGEN GERNE VON MEINEM PROJEKT, KUNST AUFRÄUMEN, ERZÄHLEN. |
| NMT | I WANT TO CLEAN YOU THIS MORNING, FROM MY PROJECT, TO SAY ART. |
| + TOPICS | I WOULD LIKE TO TALK TO YOU TODAY BY MY PROJECT, ART CLEAN. |
| REFERENCE | I WOULD LIKE TO TALK TO YOU THIS MORNING ABOUT MY PROJECT, TIDYING UP ART. |
| SOURCE | ...UNSERE KOLLEGEN AN TUFTS VERBINDEN MODELLE WIE DIESE MIT DURCH TISSUE ENGINEERING ERZEUGTEN KNOCHEN, UM ZU SEHEN, WIE KREBS ICH VON EINEM TEIL DES KÖRPERS ZUM NÄCHSTEN VERBREITEN KÖNNTE. |
| NMT | ...OUR NOAA COLLEAGUES COMBINED MODELS OF MODELS LIKE THIS WITH TISSUE GENERATED BONES FROM BONES TO SEE HOW CANCER COULD SPREAD FROM ONE PART OF THE BODY, TO THE NEXT DISTRIBUTION. |
| + TOPICS | ...OUR COLLEAGUES AT TUFTS ARE USING MODELS LIKE THIS WITH TISSUE-BASED ENGINEERED BONES TO SEE HOW CANCER COULD SPREAD FROM A PART OF THE BODY TO THE NEXT PART. |
| REFERENCE | ...OUR COLLEAGUES AT TUFTS ARE MIXING MODELS LIKE THESE WITH TISSUE-ENGINEERED BONE TO SEE HOW CANCER MIGHT SPREAD FROM ONE PART OF THE BODY TO THE NEXT. |

USING META-INFORMATION IN NEURAL MACHINE TRANSLATION

CROSS REFERENCE TO RELATED APPLICATIONS

This application is a continuation of U.S. patent application Ser. No. 15/584,482 by Matusov et al., entitled "Using Meta-Information in Neural Machine Translation," filed May 2, 2017; which claims priority benefit of U.S. Provisional Patent Application No. 62/332,608 by Matusov et al., entitled "Using Meta-Information in Neural Machine Translation," filed on May 6, 2016; each of which is hereby incorporated by reference herein in its entirety.

TECHNICAL FIELD

This disclosure pertains generally to methods and systems for using meta-information in neural machine translation, and in some examples to specific algorithms therefore.

BACKGROUND

Conventional machine translation is not always effective in translating text accurately, or in context. This disclosure teaches technical solutions using neural machine translation (NMT) for addressing these technical problems.

BRIEF DESCRIPTION OF THE DRAWINGS

In order more easily to identify the discussion of any particular element or act, the most significant digit or digits in a reference number refer to the figure number in which that element is first introduced.

FIG. 8 depicts in Table 800 corpus statistics for certain translation tasks, in accordance with example embodiments.

FIG. 9 depicts in Table 900 an evaluation of different approaches for topic-aware neural machine translation (NMT), in accordance with example embodiments.

FIG. 10 depicts in Table 1000 an example of improved translation quality when topic information is used as input in an (NMT) system, in accordance with example embodiments.

DETAILED DESCRIPTION

Figure 1:
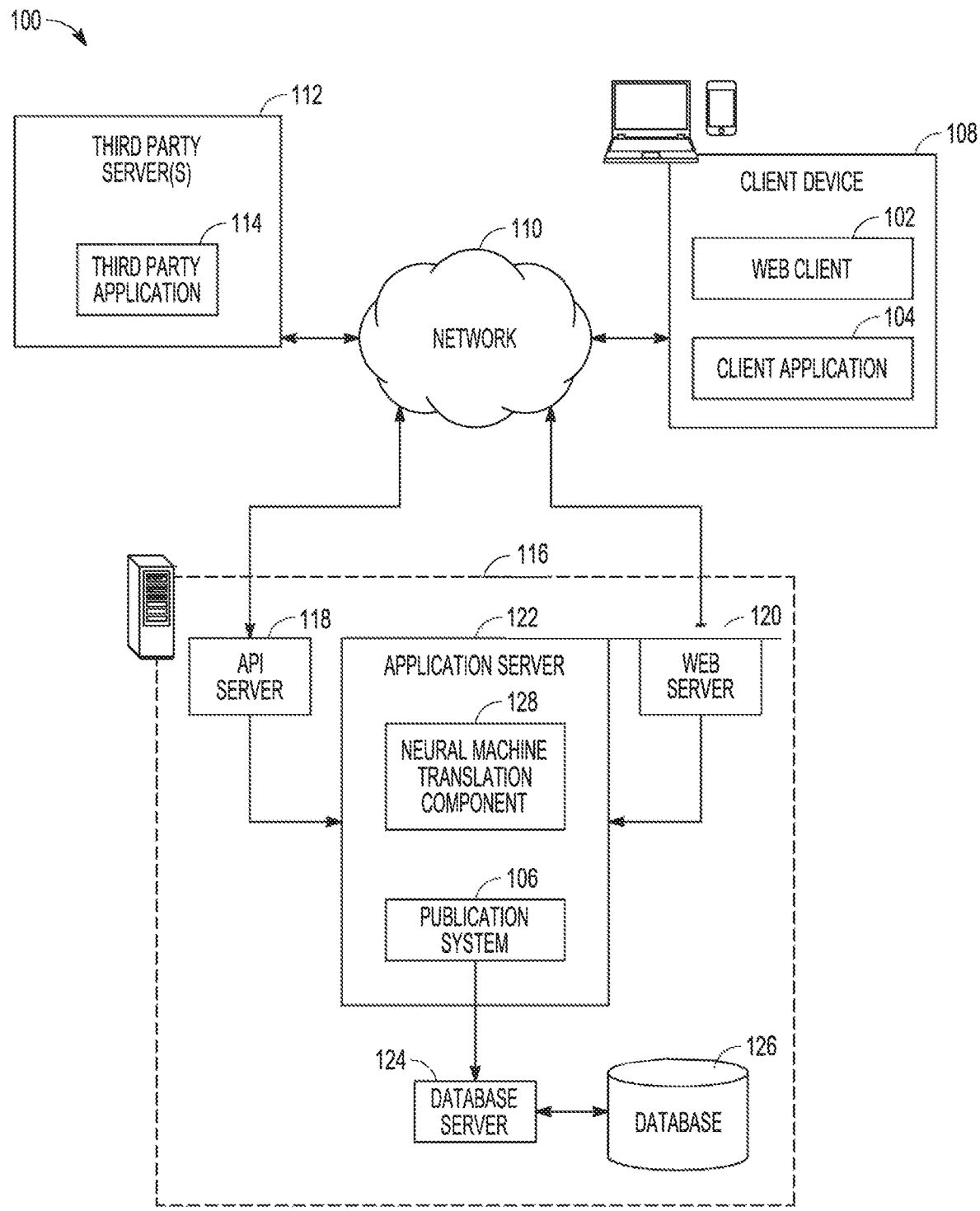
FIG. 1 is a block diagram illustrating a networked system, according to some example embodiments.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra-books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner.

In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time.

For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2016, eBay Inc., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

With reference to FIG. 1, an example embodiment of a high-level SaaS network architecture 100 is shown. A networked system 116 provides server-side functionality via a network 110 (e.g., the Internet or wide area network (WAN)) to a client device 108. A web client 102 and a programmatic client, in the example form of an application 104 are hosted and execute on the client device 108. The networked system 116 includes and application server 122, which in turn hosts a publication system 106 that provides a number of functions and services to the application 104 that accesses the networked system 116. The application 104 also provides a number of interfaces described herein, which present output of the tracking and analysis operations to a user of the client device 108.

The client device 108 enables a user to access and interact with the networked system 116. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An Application Program Interface (API) server 118 and a web server 120 are coupled to, and provide programmatic and web interfaces respectively, to the application server 122. The application server 122 hosts a publication system 106, which includes components or applications. One such component is a neural machine translation component 128. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third party application 114, executing on a third party server 112, is shown as having programmatic access to the networked system 116 via the programmatic interface provided by the Application Program Interface (API) server 118. For example, the third party application 114, using information retrieved from the networked system 116, may support one or more features or functions on a web site hosted by the third party.

Turning now specifically to the applications hosted by the client device 108, the web client 102 may access the various systems (e.g., publication system 106) via the web interface supported by the web server 120. Similarly, the application 104 (e.g., an "app") accesses the various services and functions provided by the publication system 106 via the programmatic interface provided by the Application Program Interface (API) server 118. The application 104 may, for example, an "app" executing on a client device 108, such as an iOS or Android OS application to enable user to access and input data on the networked system 116 in an off-line manner, and to perform batch-mode communications between the programmatic client application 104 and the networked system networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publication system 106 could also be implemented as a standalone software program, which do not necessarily have networking capabilities.

Figure 2:
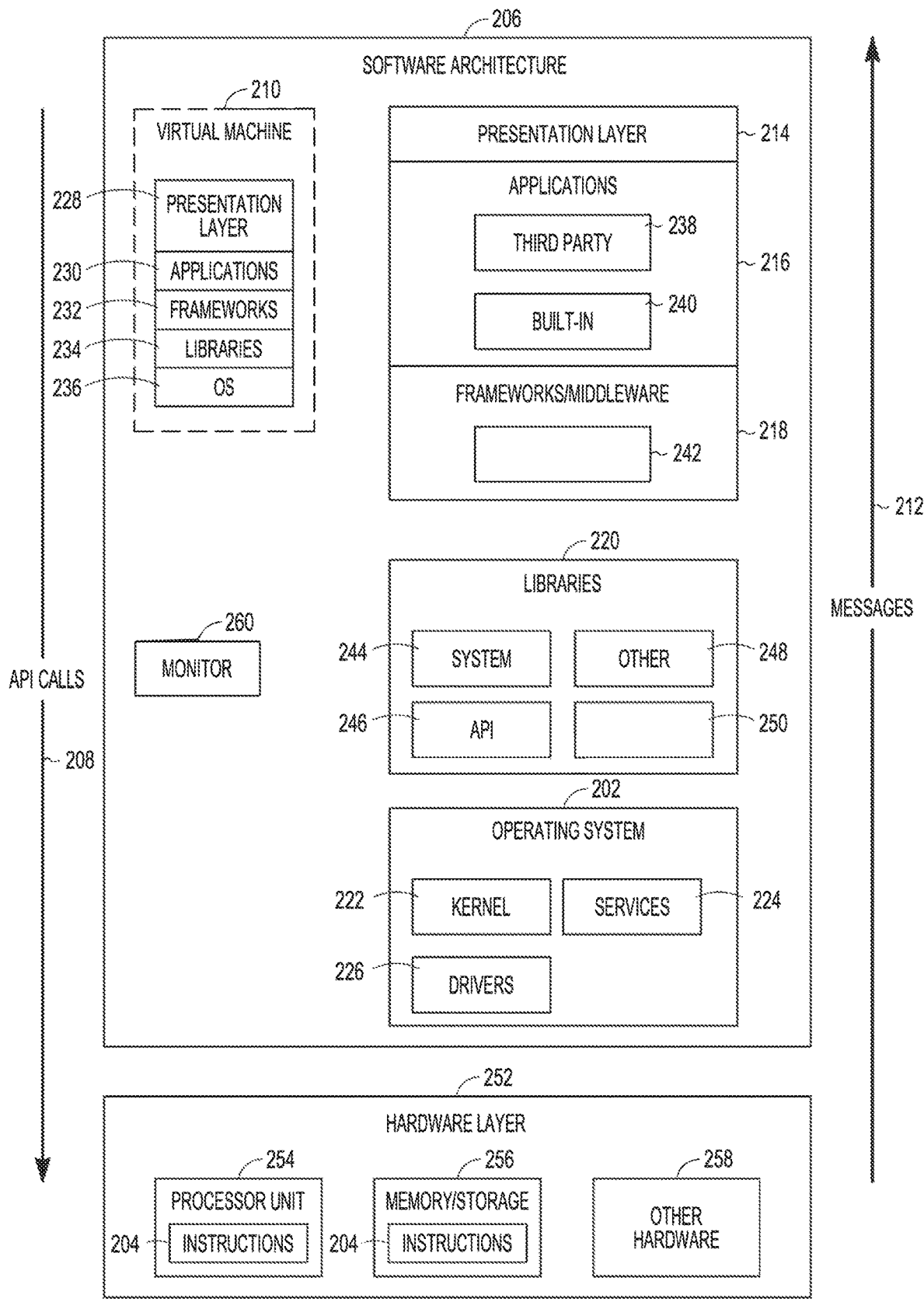
FIG. 2 is a block diagram illustrating a representative software architecture, which may be used in conjunction with various hardware architectures herein described.

FIG. 2 is a block diagram illustrating an example software architecture 206, which may be used in conjunction with various hardware architectures herein described. FIG. 2 is a non-limiting example of a software architecture and it will be appreciated that many other architectures may be implemented to facilitate the functionality described herein. The software architecture 206 may execute on hardware such as machine 300 of FIG. 3 that includes, among other things, processors 304, memory 314, and I/O components 318. A representative hardware layer 252 is illustrated and can represent, for example, the machine 300 of FIG. 3. The representative hardware layer 252 includes a processing unit 254 having associated executable instructions 204. Executable instructions 204 represent the executable instructions of the software architecture 206, including implementation of the methods, components and so forth described herein. The hardware layer 252 also includes memory and/or storage modules memory/storage 256, which also have executable instructions 204. The hardware layer 252 may also comprise other hardware 258.

In the example architecture of FIG. 2, the software architecture 206 may be conceptualized as a stack of layers where each layer provides particular functionality. For example, the software architecture 206 may include layers such as an operating system 202, libraries 220, applications 216 and a presentation layer 214. Operationally, the applications 216 and/or other components within the layers may invoke application programming interface (API) API calls 208 through the software stack and receive a response as in response to the API calls 208. The layers illustrated are representative in nature and not all software architectures have all layers. For example, some mobile or special purpose operating systems may not provide a frameworks/ middleware 218, while others may provide such a layer. Other software architectures may include additional or different layers.

The operating system 202 may manage hardware resources and provide common services. The operating system 202 may include, for example, a kernel 222, services 224 and drivers 226. The kernel 222 may act as an abstraction layer between the hardware and the other software layers. For example, the kernel 222 may be responsible for memory management, processor management (e.g., scheduling), component management, networking, security settings, and so on. The services 224 may provide other common services for the other software layers. The drivers 226 are responsible for controlling or interfacing with the underlying hardware. For instance, the drivers 226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 220 provide a common infrastructure that is used by the applications 216 and/or other components and/or layers. The libraries 220 provide functionality that allows other software components to perform tasks in an easier fashion than to interface directly with the underlying operating system 202 functionality (e.g., kernel 222, services 224 and/or drivers 226). The libraries 220 may include system libraries 244 (e.g., C standard library) that may provide functions such as memory allocation functions, string manipulation functions, mathematical functions, and the like. In addition, the libraries 220 may include API libraries 246 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 220 may also include a wide variety of other libraries 248 to provide many other APIs to the applications 216 and other software components/modules.

The frameworks frameworks/middleware 218 (also sometimes referred to as middleware) provide a higher-level common infrastructure that may be used by the applications 216 and/or other software components/modules. For example, the frameworks/middleware 218 may provide various graphic user interface (GUI) functions, high-level resource management, high-level location services, and so forth. The frameworks/middleware 218 may provide a broad spectrum of other APIs that may be utilized by the applications 216 and/or other software components/modules, some of which may be specific to a particular operating system or platform.

The applications 216 include built-in applications 238 and/or third-party applications 240. Examples of representative built-in applications 238 may include, but are not limited to, a contacts application, a browser application, a book reader application, a location application, a media application, a messaging application, and/or a game application. Third-party applications 240 may include any an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 240 may invoke the API calls 208 provided by the mobile operating system (such as operating system 202) to facilitate functionality described herein.

The applications 216 may use built in operating system functions (e.g., kernel 222, services 224 and/or drivers 226), libraries 220, and frameworks/middleware 218 to create user interfaces to interact with users of the system. Alternatively, or additionally, in some systems interactions with a user may occur through a presentation layer, such as presentation layer 214. In these systems, the application/component "logic" can be separated from the aspects of the application/component that interact with a user.

Some software architectures use virtual machines. In the example of FIG. 2, this is illustrated by a virtual machine 210. The virtual machine 210 creates a software environment where applications/components can execute as if they were executing on a hardware machine (such as the machine 300 of FIG. 3, for example). The virtual machine 210 is hosted by a host operating system (operating system (OS) 236 in FIG. 2) and typically, although not always, has a virtual machine monitor 260, which manages the operation of the virtual machine as well as the interface with the host operating system (i.e., operating system 202). A software architecture executes within the virtual machine 210 such as an operating system operating system (OS) 236, libraries 234, frameworks 232, applications 230 and/or presentation layer 228. These layers of software architecture executing within the virtual machine 210 can be the same as corresponding layers previously described or may be different.

Figure 3:
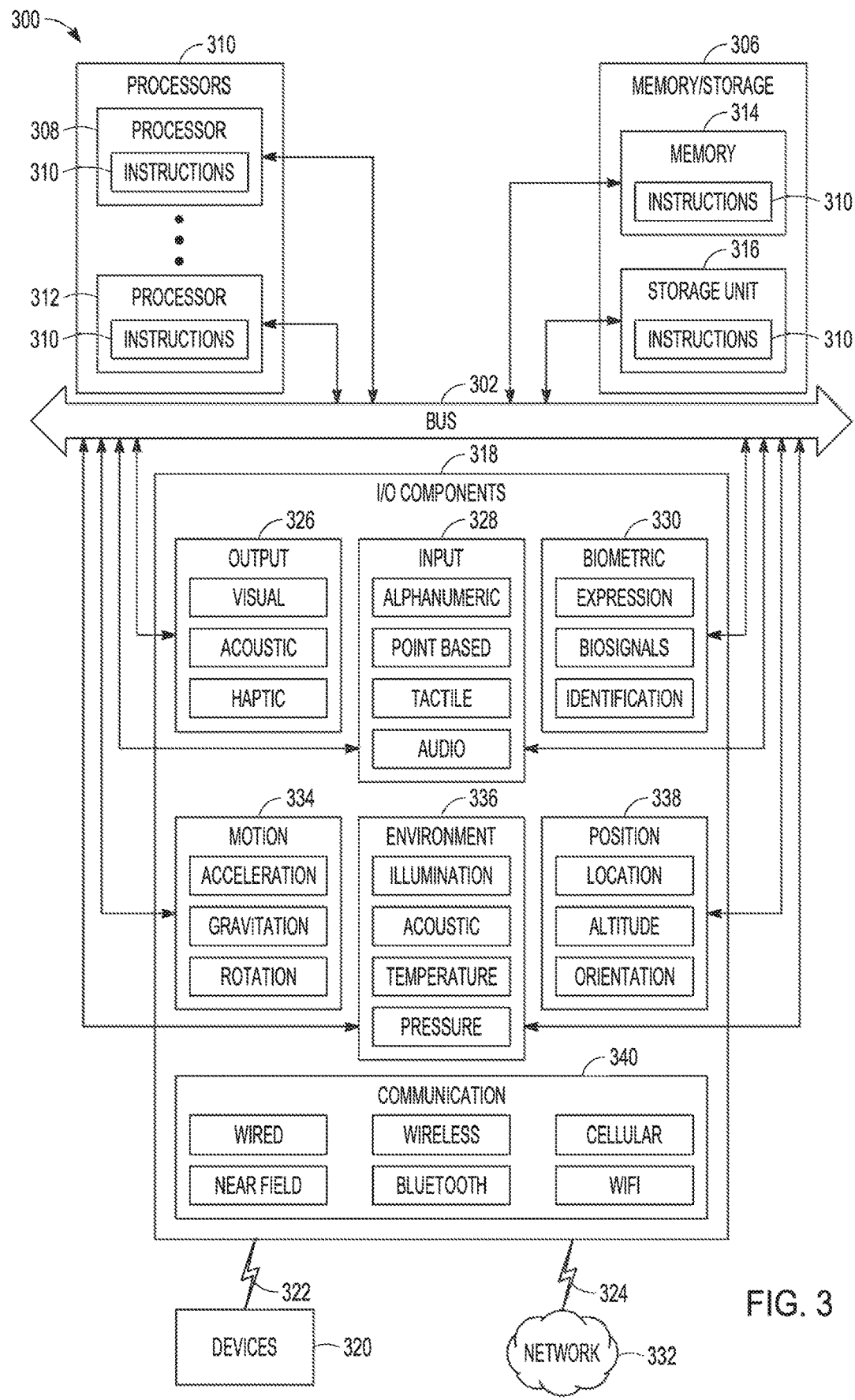
FIG. 3 is a block diagram illustrating components of a machine, according to some example embodiments, able to read instructions from a machine-readable medium (e.g., a machine-readable storage medium) and perform any one or more of the methodologies discussed herein.

FIG. 3 is a block diagram illustrating components of a machine 300, according to some example embodiments, able to read instructions from a machine-readable medium (e.g., a machine-readable storage medium) and perform any one or more of the methodologies discussed herein. Specifically, FIG. 3 shows a diagrammatic representation of the machine 300 in the example form of a computer system, within which instructions 310 (e.g., software, a program, an application, an applet, an app, or other executable code) for causing the machine 300 to perform any one or more of the methodologies discussed herein may be executed. As such, the instructions may be used to implement modules or components described herein. The instructions transform the general, non-programmed machine into a particular machine programmed to carry out the described and illustrated functions in the manner described. In alternative embodiments, the machine 300 operates as a standalone device or may be coupled (e.g., networked) to other machines. In a networked deployment, the machine 300 may operate in the capacity of a server machine or a client machine in a server-client network environment, or as a peer machine in a peer-to-peer (or distributed) network environment. The machine 300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 310, sequentially or otherwise, that specify actions to be taken by machine 300. Further, while only a single machine 300 is illustrated, the term "machine" shall also be taken to include a collection of machines that individually or jointly execute the instructions 310 to perform any one or more of the methodologies discussed herein.

The machine 300 may include processors 304, memory memory/storage 306, and I/O components 318, which may be configured to communicate with each other such as via a bus 302. The memory/storage 306 may include a memory 314, such as a main memory, or other memory storage, and a storage unit 316, both accessible to the processors 304 such as via the bus 302. The storage unit 316 and memory 314 store the instructions 310 embodying any one or more of the methodologies or functions described herein. The instructions 310 may also reside, completely or partially, within the memory 314, within the storage unit 316, within at least one of the processors 304 (e.g., within the processor's cache memory), or any suitable combination thereof, during execution thereof by the machine 300. Accordingly, the memory 314, the storage unit 316, and the memory of processors 304 are examples of machine-readable media.

The I/O components 318 may include a wide variety of components to receive input, provide output, produce output, transmit information, exchange information, capture measurements, and so on. The specific I/O components 318 that are included in a particular machine will depend on the type of machine. For example, portable machines such as mobile phones will likely include a touch input device or other such input mechanisms, while a headless server machine will likely not include such a touch input device. It will be appreciated that the I/O components 318 may include many other components that are not shown in FIG. 3. The I/O components 318 are grouped according to functionality merely for simplifying the following discussion and the grouping is in no way limiting. In various example embodiments, the I/O components 318 may include output components 326 and input components 328. The output components 326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 328 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and any other components (image, video, voice), the input from which can be converted (by algorithms not part of this embodiment) to text input in an example language usable for machine translation into another example language.

In further example embodiments, the I/O components 318 may include biometric components 330, motion components 334, environmental components 336, or position components 338 among a wide array of other components which can provide meta-information about the (main) text input or any other input that can be converted to text. For example, the biometric components 330 may include components to identify a person (e.g., voice identification, retinal identification, facial identification, fingerprint identification, or electroencephalogram based identification), and the like. The motion components 334 may include acceleration sensor components (e.g., accelerometer), which, for example, can provide meta-information that the input text is related to driving or travel, and so forth. The environment components 336 may include, for example, proximity sensor components (e.g., infrared sensors that detect nearby objects such as, for example, furniture which would act as meta-information to relay to the topic of the input text), or other components that may provide indications, measurements, or signals corresponding to a surrounding physical environment. The position components 338 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 318 may include communication components 340 operable to couple the machine 300 to a network 332 or devices 320 via coupling 322 and coupling 324 respectively. For example, the communication components 340 may include a network interface component or other suitable device to interface with the network 332. In further examples, communication components 340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 320 may be another machine or any of a wide variety of peripheral devices (e.g., a peripheral device coupled via a Universal Serial Bus (USB)).

Moreover, the communication components 340 may detect identifiers or include components operable to detect identifiers. For example, the communication components processors communication components 340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 340, such as, location via Internet Protocol (IP) geo-location, location via Wi-Fi® signal triangulation, location via detecting a NFC beacon signal that may indicate a particular location, and so forth.

Figure 4:
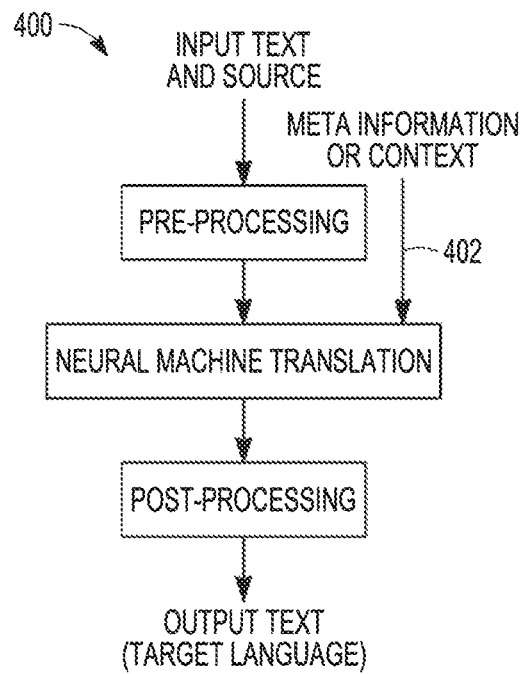
FIG. 4 illustrates the neural translation architecture, where input text is augmented with meta-information as an additional input signal, in accordance with the example embodiment.

In one example, a sequence-to-sequence Neural Machine Translation (NMT) system, for example including the neural machine translation component 128 in FIG. 1, is trained with an attention mechanism directed to real-life texts, for example, e-commerce texts consisting of product titles and descriptions. Meta-data associated with these texts such as product category or topic information can significantly improve translation quality when used as an additional signal in the neural network, as depicted at 402 in the architecture 400 shown in FIG. 4. On an e-commerce set, for example, one machine translation quality measure known as (BLEU) improves by 6% relative to results from a baseline system. Improvements of translation quality can also be obtained on a more general speech translation task.

In translating data such as e-commerce data, one example method focusses on product titles and descriptions which typically are user-generated texts describing items put on sale, for example. Such data is different to newswire or other texts typically considered in the machine translation research community. Item titles in particular are short (usually less than 15 words), contain many brand names which often do not have to be translated, but also include product feature values and specific abbreviations and jargon. Also, the vocabulary size can be very large because of the large variety of product types, and many words are observed in the training data only once or a few times. At the same time, the e-commerce data is also provided with additional context through the meta-information which is typically given about an item (for example, a product category such as clothing or electronics), which can be used to perform topic adaptation for improved translation quality.

At first blush, established phrase-based statistical machine translation (SMT) approaches may appear well-suited for e-commerce data translation. In a phrase-based approach, for example, unambiguous words and phrases can be translated well even if they are observed only once in a test set. Also, because the alignment between source and target words is usually available and deterministic, it is possible to transfer certain entities from a source sentence to a generated target sentence in context without translating them. Such entities can include numbers, product specifications such as "5S" or "0.35XX", as well as brand names. In training, these entities can be replaced with placeholders, which also significantly reduce the vocabulary size.

However, (NMT) approaches of the present disclosure are more powerful at capturing context beyond phrase-based boundaries and are better able to exploit available training data. They can successfully adapt to a domain for which only a limited amount of parallel training data is available. Conversely, it is difficult to obtain translation quality improvements with topic adaptation in phrase-based (SMT) because of data scarcity and a large number of topics corresponding to product categories which may or may not be relevant for disambiguating between alternative translations, word order, or solving other known machine translation problems. In contrast, (NMT) is better able to solve the topic adaptation problem by using the additional meta-information as an extra signal in the neural network system. Additional information about the text topic is thus embedded into the vector space and used to influence (NMT) decision directly.

In one example showing the universality of the current approach, (NMT) translation experiments were performed on both spoken language domain (in this example, IWSLT German-to-English TED talks) as well as in the e-commerce domain (in this example, translation of product titles from English to French), both of which sets of data have category/topic meta-information. Consistent improvements were observed on both translation tasks, the best model from one of the tasks having outperformed a strong phrase-based system.

The following disclosure is structured as follows. An introduction to (NMT) technology is followed by a description in more detail of how category or topic or any other meta-information can be used in (NMT). Experimental results are presented on the two translation tasks mentioned above, namely the established TED talk German-to-English spoken language translation task and the e-commerce English-French translation task.

Figure 5:
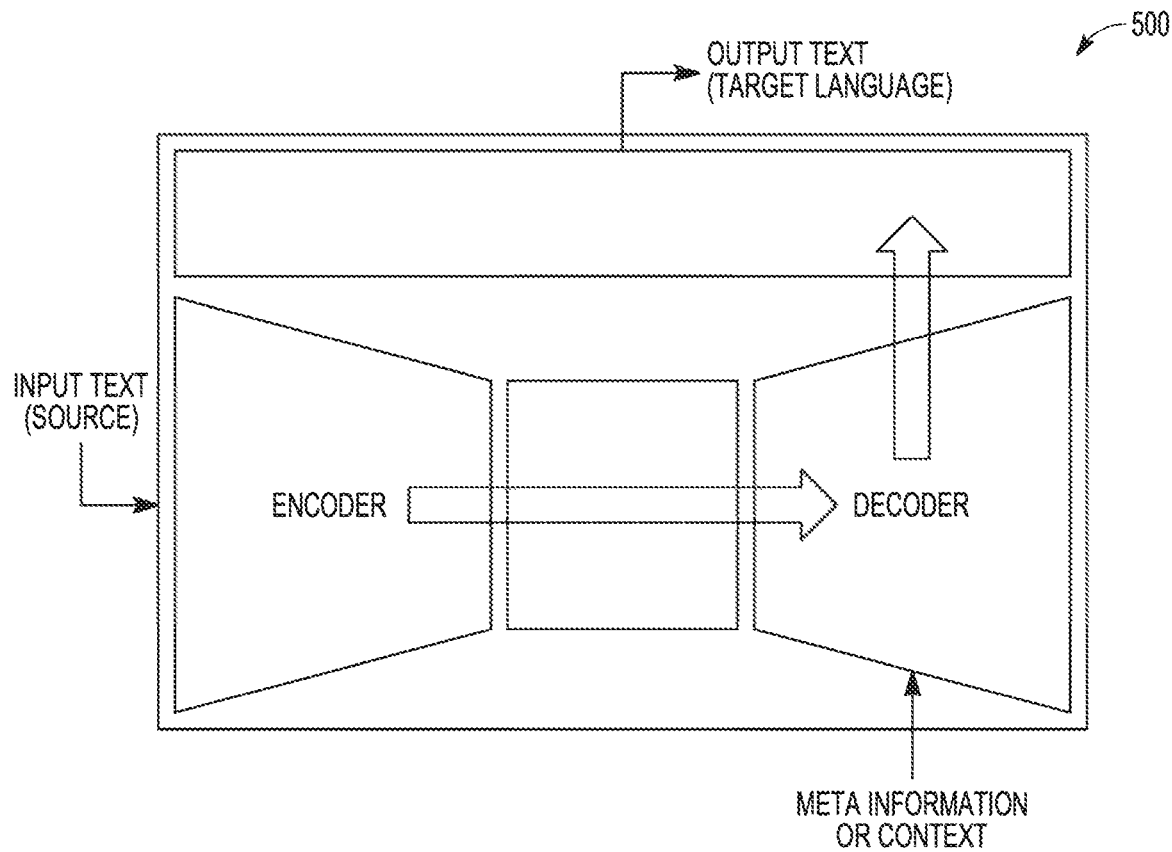
FIG. 5 illustrates an encoder-decoder model, in accordance with an example embodiment.

Neural machine translation (NMT) uses recurrent neural networks to learn both how to align and translate data. In one example, an (NMT) system is trained end-to-end to maximize the conditional probability of a correct translation given a source sentence. When using different advanced features, in particular an attention mechanism, (NMT) can reach comparable translation quality as state-of-art phrase-based translation systems. In one example, an (NMT) translation system uses an encoder-decoder architecture 500 as shown in FIG. 5 in which an input sentence is first encoded into a fixed-length representation and from which the decoder generates target words. Because a fixed-length representation example does not sometimes provide enough information for decoding, a more sophisticated approach including an attention mechanism is used such as the example 500 shown in FIG. 5. In such an approach, the neural network system learns to generate soft alignment to the words in the source sentence to enhance translation quality.

In an e-commerce domain, for example, information on the product category (e.g., "men's clothing", "mobile phones", "kitchen appliances") often accompanies a product title and description and can be used as an additional source of information both in training of a MT system and during translation. In particular, such meta-information can help to disambiguate between alternative translations of the same word that have different meaning. The choice of the right translation often depends on the category. For example, the word "skin" has to be translated differently in the categories "mobile phone accessories" and "make-up". Outside the e-commerce world, similar topic information is available in the form of tags and keywords, for example, for a given document (on-line article, blog post, patent, etc.) and can also be used for word sense disambiguation and topic adaptation. Generally, any meta-information relating to an input sentence, paragraph, or document can be used in the proposed approach if it can be represented in a vector form. In the example case of meta-information being the topic or category information, the same document can belong to multiple topics or categories. One possible approach is to feed the meta-information into recurrent neural network decoder as shown in FIG. 5 to help generate words which are appropriate given a particular category or topic.

One approach in an example embodiment is to represent category or topic information in a D-dimensional vector, where D is the number of different categories. Since one sentence can belong to multiple categories (possibly with different probabilities/weights), this vector is normalized to fulfill the constraint Equation 1 (any other type of normalization like vector length normalization can also be applied):

$$\sum_{k=1}^{D} l_i = 1 \qquad (1)$$

Where $I \in R^D$ represents the category membership vector. This data is entered into a decoder of a neural network system to influence a proposed target posterior word distribution for target words y. The conditional probability given the category membership vector can be written as Equation 2:

$$p(y_t|y_{<t-1}, c_t, s_{t-1}, I) = p(y_t|y_{t-1}, c_t, s_{t-1}, I) \approx g(y_{t-1}, s_{t-1}, c_t, I) \qquad (2)$$

where $c_t$ is a fixed-length time-variant vector to encode source sentence that is based on the attention at time step t, $s_t$ and $y_t$ are respectively the hidden state and the output of decoder RNN at time step t and g(.) is a non-linear function used to approximate the probability distribution. In our implementation, we introduce an intermediate readout layer to build function g which is a feed-forward network as depicted in FIG. 5.

Figure 6:
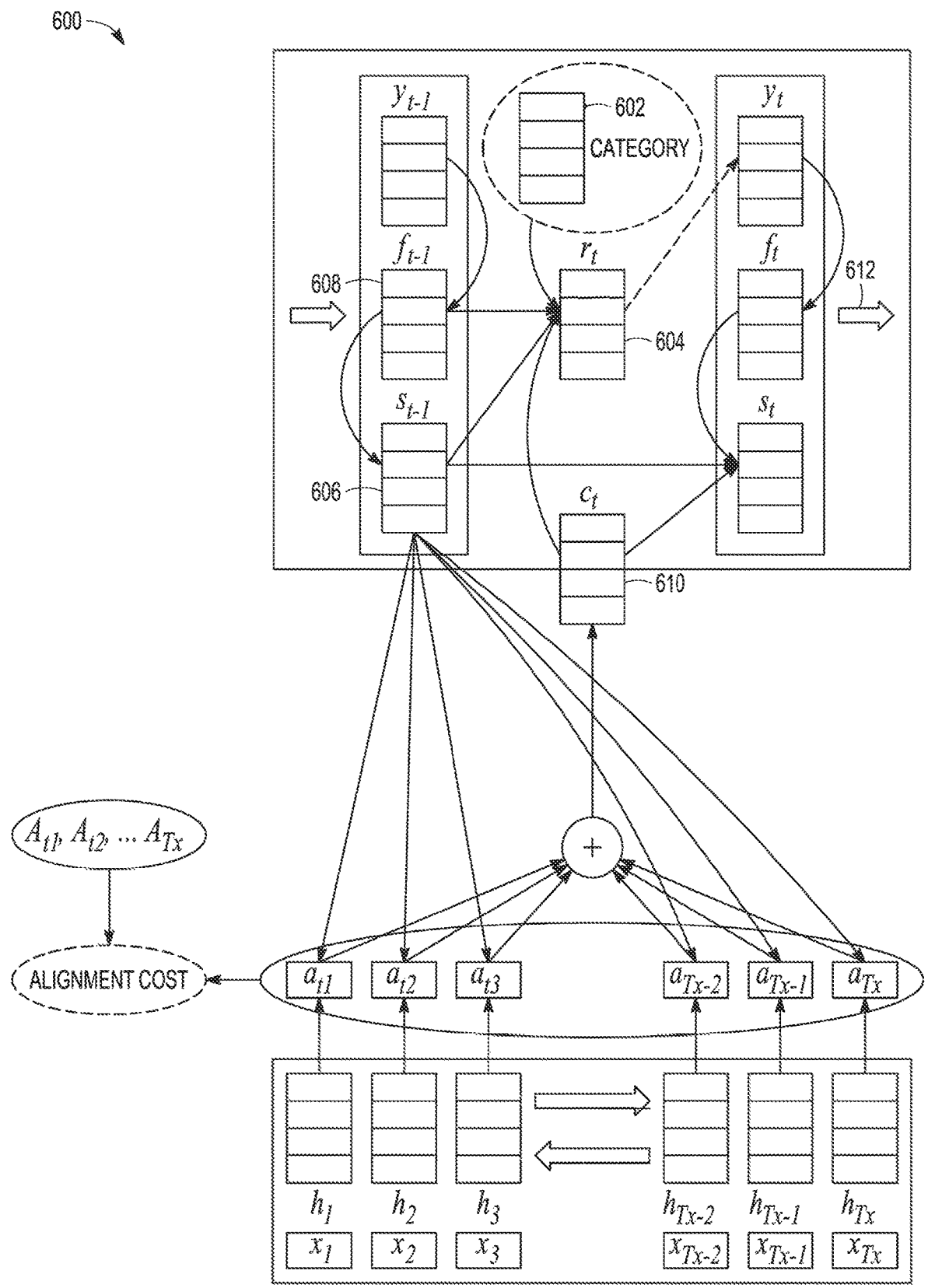
FIG. 6 illustrates an example neural encoder and an attention based decoder, showing an example architecture point for the insertion of a topic or category, or other meta information, as an additional input to influence machine translation decisions, in accordance with example embodiments.

FIG. 6 illustrates a topic-aware encoder-decoder model 600, in accordance with an example embodiment. In the (NMT) decoder, the topic membership vector is entered into a readout layer (700 in FIG. 7) in each recurrent step to enhance word selection. As shown in FIG. 6, a topic membership vector/(402) is fed into an (NMT) decoder 404 as an additional input besides the context vector $c_t$ attending to the distributed representation of the source sentence words $X_1$ to $X_T$, and the previous decoder state $s_{t-1}$.

$$p(y_t|y_{<t-1}, c_t, s_{t-1}, l) = p(y_t|r_t) \text{ where } r_t = W_r[c_t; f_{t-1}; s_{t-1}; l] + b_r$$

Here, $W_r$ is a concatenation of the original transformation matrix and l, $r_t$ is the output from a readout layer 700 (FIG. 7) and $f_t$ is the embedding of the last target word $y_{t-1}$; $s_{t-1}$ refers to the last decoder state, $W_r$ and $b_r$ are weights and bias for linear transformation, respectively. The formula can be rearranged as:

$$r_t = [W_c; W_r'][c_t; f_{t-1}; s_{t-1}; l] + b_r$$
$$= W_c c_t + W_r'[f_{t-1}; s_{t-1}; l] + b_r$$
$$= E_c + W_r'[f_{t-1}; s_{t-1}; l] + b_r$$

where $W_r$ is concatenation of original transformation matrix $W_r'$ and topic transformation matrix $W_c$. Then adding a topic into the readout layer as input is equivalent to adding an additional topic vector $E_c$ into the original readout layer output. Assuming $c_t$ is a one-hot column vector, then $W_c c_t$ is equivalent to retrieving specific column from the $W_c$. Hence, this additional vector $E_c$ can be regarded as a topic embedding or a continuous representation of topic information.

Figure 7:
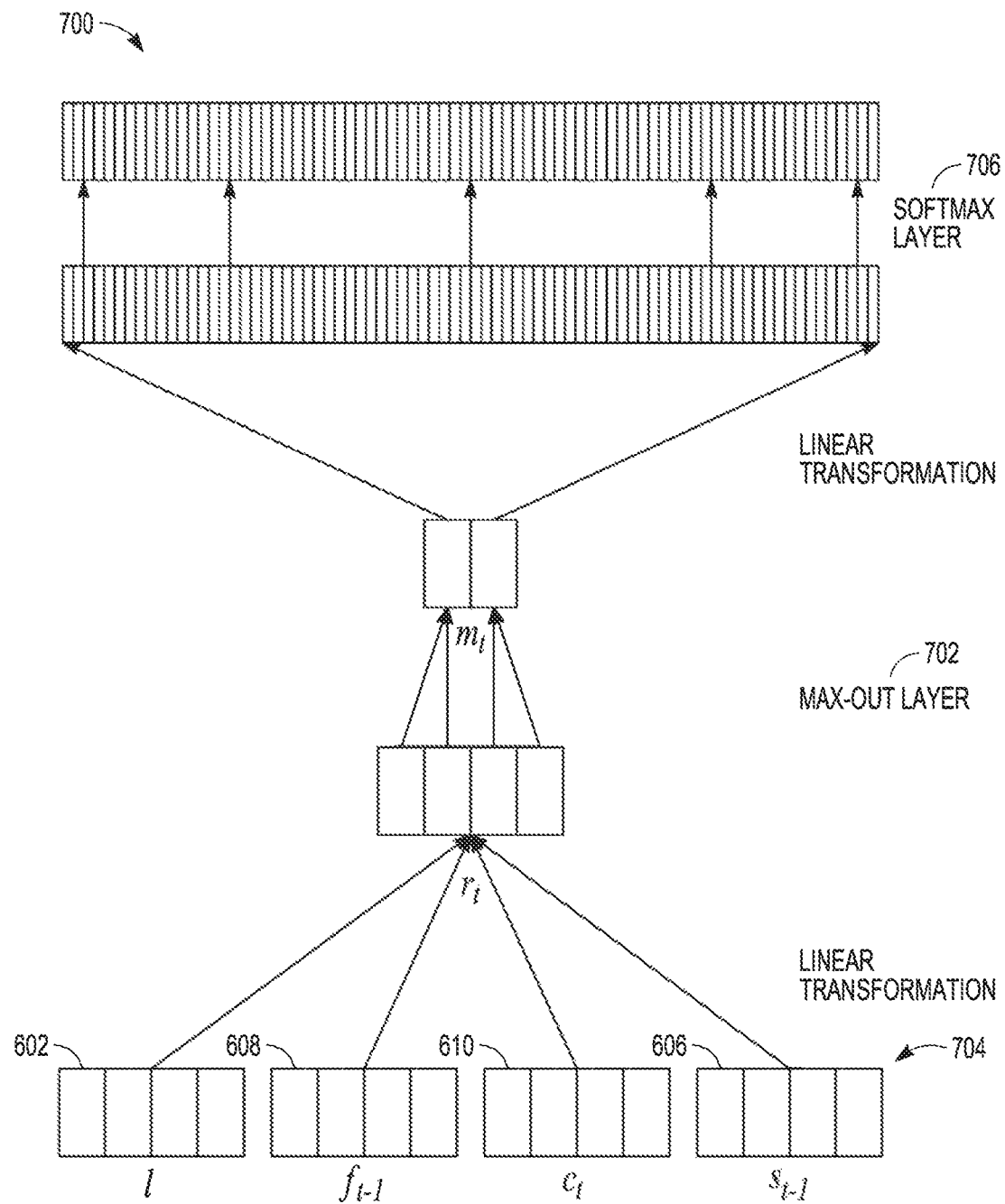
FIG. 7 illustrates a topic-aware readout layer of a decoder, in accordance with an example embodiment.

The readout layer depicted in FIGS. 6 and 7 merges information from the last state $s_{t-1}$ (606), last decoded word embedding $f_{t-1}$ (608), as well as the current context $c_t$ (610) to generate an output 612. It can be seen as a shallow network which comprises, with reference to FIG. 7, a max-out layer 702, a fully-connected layer 704, and a softmax layer 706. In decoding, the last decoded word comes from sampling with respect to the proposed word distribution.

In a further example, (MT) experiments were performed on a German-to-English TED talk transcribed speech translation task and on an in-house English-to-French e-commerce translation task. As part of the data preprocessing, the corpora were tokenized and lowercased. Also replaced were numbers, product specifications, and other special symbols with placeholders such as $num. These placeholders were kept during training, but their content was preserved as XML markup in development and testing sets. This content was inserted for the generated placeholders on the target side based on the attention mechanism. In a beam search for the best translation, it was ensured that each placeholder content was inserted only once. Using the same mechanism, out-of-vocabulary (OOV) words were passed to the target side "as is" (i.e. without using any special unknown word symbol).

For the English-to-French TED talk data set, the topic keywords of each TED talk were mapped to ten general categories such as politics, environment, education, and others. All sentences in the same talk shared the same category, and one talk could belong to several categories. Instead of using the official IWSLT development or test data, the development or test sentences which had the highest probability of belonging to a particular category were set aside. The details of the TED talk data set are described in column 802 in Table 800 of FIG. 8.

For an e-commerce data supply, one example method used a product categories such as fashion and electronics as topic information as part of a total of eighty (80) most widely used categories, plus a category called "other" that combined all the less frequent categories into one category. The training set contained both product titles and product descriptions, while development and testing sets contained only product titles. The details of the e-commerce data set are described in column 804 in Table 800 of FIG. 8.

One example neural translation model was implemented using a "Blocks" deep learning library which was based on an open-source MILA translation project. An implementation of the example (NMT) baseline system described above trained on the WMT 2014 English-to-French machine translation task obtained a similar (BLEU) score on a test set as typically reported in the literature on (NMT) approaches, so that the starting point for evaluating the example embodiment was a competitive state-of-the-art (NMT) system. Implementation of the herein-described category-aware algorithm features yielded improved results compared to this strong baseline, as described below.

In one example, the word embedding size of the NMT encoder and decoder was set to six hundred and twenty (620) and models employing a one-layer bi-directional GRU encoder and a two-layer GRU decoder in different experiments were used. As training data, the top fifty thousand (50,000) German words and top thirty thousand (30,000) English words were selected as training vocabulary in the TED talk translation task, with respectively fifty-two thousand (52,000) English and fifty-two thousand (52,000) French vocabulary sets in the e-commerce translation task. The optimization of the training was performed using the Adadelta algorithm. A beam size of ten (10) was selected for a development and test set translation.

For training implementation, a gradient descent with a batch size of one hundred (100) was used, saving model parameters after a certain number of iterations. Around thirty (30) consecutive model dumps were saved for enhanced model selection. To select the best iteration, a combination of established (MT) evaluation measures such as (BLEU) and translation edit rate (TER) were calculated on the development set. This compound metric was considered to be more stable and reliable especially on the e-commerce data. After model selection, a winning model on the test set was identified using the (BLEU) and (TER) metrics.

TITAN X GPUs with 12 GB of RAM were used to run experiments on Ubuntu Linux 14.04. The training for the TED talk task took 1-2 days to run until convergence. The training on the e-commerce data took about 3 days until convergence. For example, it can take about 10 minutes or less to finish translation of 1000 sentences from development or test data, the exact time depends on the vocabulary size and cell size.

Various example models were tested using different approaches to identify instances where a topic or category information fit best into (NMT), since category information can affect alignment, word selection, and so forth. In some examples, different types of topic information were used. For example, categories predicted automatically with a Latent Dirichlet Analysis (LDA) and human-labeled categories were used as input to a neural network, for example as shown in FIG. 6. In both cases, one sentence was allowed to belong to multiple categories.

The results of the experiments with different types of topic information on the e-commerce translation task are shown in Table 900 in FIG. 9 and indicate that category information as a pseudo word (prefixed human labeled category) does not carry enough semantic and syntactic meaning in comparison to real source words to have a positive effect on the target words predicted in the decoder. The (BLEU) score of such system at 18.3% is even below the baseline at 18.6%.

In contrast, the human-labeled categories added in the read-out layer are more reliable and are able to positively influence word selection in the (NMT) decoder, the result at 19.7% BLEU significantly outperforming the baseline.

Replacing the human-labeled category one-hot vectors having a dimension size of (eighty) 80 with LDA-predicted topic distribution vectors of the same dimension in the read-out layer of the neural network deteriorated the (BLEU) and (TER) scores significantly, at 14.5% BLEU, as seen in Table 900 in FIG. 9. This is attributed to data scarcity problems when training the LDA of dimension 80 on product titles.

Figure 11:
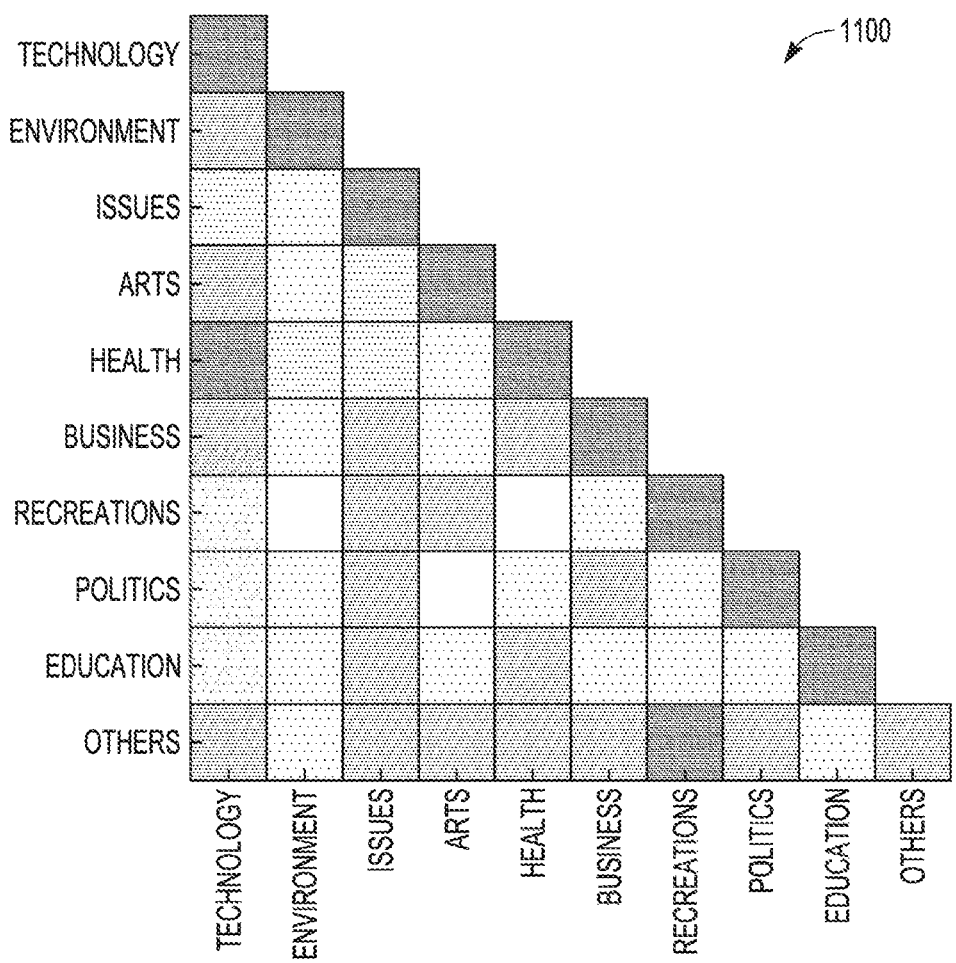
FIG. 11 depicts example cosine distances for topic embedding, in accordance with example embodiments.

On the German-to-English task, quality improvements were also observed when using human-labeled category information. Here, category embeddings (E_c) from different experiments were extracted from the (NMT) model, and their cosine distances were computed and visualized, for example as shown by the comparative block graph 1100 in FIG. 11. It may be seen that in different experiments, the same category tends to share similar representation in continuous embedding space. At the same time, similar category pairs like "politics"' and "issues" tend to have shorter distance from each other. With reference to Table 1000 of FIG. 10, example phrases such as "I would like to talk to you this morning about my project, Tidying Up Art" or " . . . our colleagues at Tufts are mixing models like these with tissue-engineered bone to see how cancer might spread form one part of the body to the next" can be seen as markedly improved German-to-English (NMT) translations when human-labeled category information is used.

For further comparison, other example models were trained as phrase-based (SMT) models using the Moses toolkit on both translation tasks. One model used standard Moses features, including a 4-gram LM trained on the target side of the bilingual data, word-level and phrase-level translation probability, as well as a distortion model with a maximum distortion of 6. A stronger phrase-based baseline included additional 5 features of a 4-gram operation sequence model.

The best (NMT) model on the TED talk data task was created using an ensemble of three different (NMT) models trained with different features, including category/topic information, which outperformed the comparative phrase-based system described above by over 2.1 (BLEU) points absolute.

On both the e-commerce and TED talk tasks, feeding the category or topic information as proposed herein resulted in notable translation quality improvements represented by the increased (BLEU) scores and decreased translation edit rate (TER). The examples herein thus include a novel way of utilizing category or topic meta-information in neural machine translation for achieving improved translation quality.

Thus, in one example, a neural machine translation system is provided for translating text. The system may comprise processors, and a memory storing instructions that, when executed by at least one processor among the processors, cause the system to perform certain operations. The operations may comprise, at least, obtaining a text as an input to a neural network system, supplementing the input text with meta information as an extra input to the neural network system, and delivering an output of the neural network system to a user as a translation of the input text, leveraging the meta information for translation.

In one example, the meta information comprises a product category or topic of an e-commerce listing. In one example, the neural machine translation system includes an encoder-decoder architecture in which an input sentence is first encoded into a fixed-length representation and from which the decoder generates target words. In one example, the system is trained with an attention mechanism that provides a soft alignment to source sentence words at each decoder step. In some examples, the operations may further comprise merging information from a last recurrent neural network decoder state, a last decoded word embedding, a current context or attention vector, and a vector representation of the input-specific meta-information to generate at least part of the output to the user. Still further, the operations may comprise training the neural network system using, individually or in combination, a training algorithm that utilizes meta-information associated with one of a training pair of a source language sentence and an associated target language human translation, and a document or corpus of such training pairs.

Figure 12:
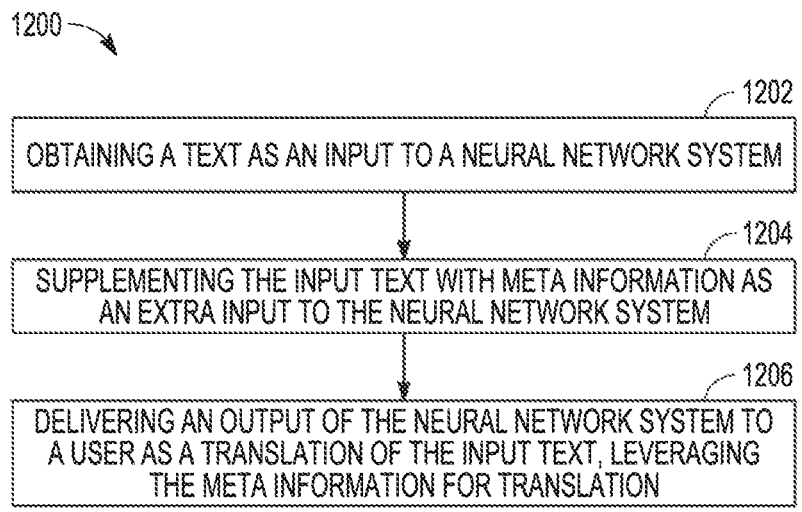
FIG. 12 illustrates a flow chart of a method, in accordance with an example embodiment.

Further examples of the present disclosure include methods. With reference to FIG. 12 of the accompanying drawings, a method 1200, at a neural machine translation system, comprises at least: at 1202, obtaining a text as an input to a neural network system; at 1204, supplementing the input text with meta information as an extra input to the neural network system; and at 1206, delivering an output of the neural network system to a user as a translation of the input text, leveraging the meta information for translation.

The meta information may comprise a product category or topic of an e-commerce listing. The method 1200 may further comprise encoding an input sentence into a fixed-length representation and generating target words. The method 1200 may further comprise training the neural machine translation system with an attention mechanism to provide a soft alignment to source sentence words at one or more decoder operations. In one example, the method 1200 may comprise merging information from a last recurrent neural network decoder state, a last decoded word embedding, a current context or attention vector, and a vector representation of the input-specific meta-information to generate at least part of the output to the user. In one example, the method 1200 may further comprise training the neural machine translation system using, individually or in combination, a training algorithm that utilizes meta-information associated with one or more of a training pair of a source language sentence and an associated target language human translation, and a document or corpus of such training pairs.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claims is:

1. A method for translating text comprising:
   training a neural network system using first meta information associated with a training pair of a source language text and a target language translation, the first meta information indicating a first product category, a first topic, or both;
   receiving, at the neural network system from a client device, an input text for an electronic commerce listing for an electronic commerce marketplace and second meta information corresponding to the input text, the second meta information indicating a second product category, a second topic, or both, associated with the electronic commerce listing;
   generating, using the neural network system, a translation of the input text based at least in part on the second meta information; and
   outputting the electronic commerce listing comprising the translation of the input text for publication via the electronic commerce marketplace.

2. The method of claim 1, wherein the input text is associated with a source language, and wherein the translation is associated with a target language, the method further comprising:
   identifying a portion of the input text to keep in the source language, wherein generating the translation of the input text comprises refraining from translating the portion of the input text.

3. The method of claim 2, wherein the portion of the input text comprises a number, a product specification, a brand name, or any combination thereof.

4. The method of claim 1, further comprising:
   generating one or more translated words associated with the input text based at least in part on the second product category, the second topic, or both, wherein the translation of the input text comprises the one or more translated words.

5. The method of claim 1, wherein the input text comprises at least one source word in a source language which is translatable into two or more target words in a target language different from the source language, the method further comprising:
   selecting a target word for the translation from the two or more target words of the target language based at least in part on the second meta information, wherein the translation of the input text comprises the selected target word.

6. The method of claim 1, wherein training the neural network system comprises:
   training a plurality of model iterations of the neural network system; and
   selecting a model iteration from the plurality of model iterations based at least in part on a translation edit rate associated with the model iteration, a bilingual evaluation understudy metric associated with the model iteration, or both, wherein the input text and the second meta information are received at the selected model iteration of the neural network system.

7. The method of claim 1, further comprising:
   generating a fixed-length vector based at least in part on the input text;
   generating a category membership vector based at least in part on the second meta information; and
   receiving the fixed-length vector and the category membership vector at the neural network system, wherein the category membership vector is configured to influence a target word selection of the translation.

8. The method of claim 1, wherein the neural network system disambiguates between alternative translations of a word included in the input text based at least in part on the second meta information.

9. The method of claim 1, wherein the input text comprises a title, a description, or both, of the electronic commerce listing, and wherein the translation of the input text comprises a translation of the title, a translation of the description, or both.

10. A system for translating text comprising:
    one or more processors; and
    a non-transitory computer-readable medium storing instructions that, when executed by the one or more processors, cause the system to perform operations comprising:
      training a neural network system using first meta information associated with a training pair of a source language text and a target language translation, the first meta information indicating a first product category, a first topic, or both;
      receiving, at the neural network system from a client device, an input text for an electronic commerce listing for an electronic commerce marketplace and second meta information corresponding to the input text, the second meta information indicating a second product category, a second topic, or both, associated with the electronic commerce listing;
      generating, using the neural network system, a translation of the input text based at least in part on the second meta information; and
      outputting the electronic commerce listing comprising the translation of the input text for publication via the electronic commerce marketplace.

11. The system of claim 10, wherein the input text is associated with a source language, and wherein the translation is associated with a target language, wherein the instructions are further executable by the one or more processors to cause the system to perform operations comprising:
    identifying a portion of the input text to keep in the source language, wherein generating the translation of the input text comprises refraining from translating the portion of the input text.

12. The system of claim 11, wherein the portion of the input text comprises a number, a product specification, a brand name, or any combination thereof.

13. The system of claim 10, wherein the instructions are further executable by the one or more processors to cause the system to perform operations comprising:
    generating one or more translated words associated with the input text based at least in part on the second product category, the second topic, or both, wherein the translation of the input text comprises the one or more translated words.

14. The system of claim 10, wherein the input text comprises at least one source word in a source language which is translatable into two or more target words in a target language different from the source language, wherein the instructions are further executable by the one or more processors to cause the system to perform operations comprising:

selecting a target word for the translation from the two or more target words of the target language based at least in part on the second meta information, wherein the translation of the input text comprises the selected target word.

15. The system of claim 10, wherein the instructions to train the neural network system are further executable by the one or more processors to cause the system to perform operations comprising:

training a plurality of model iterations of the neural network system; and selecting a model iteration from the plurality of model iterations based at least in part on a translation edit rate associated with the model iteration, a bilingual evaluation understudy metric associated with the model iteration, or both, wherein the input text and the second meta information are received at the selected model iteration of the neural network system.

16. A non-transitory computer-readable medium storing instructions which, when executed by a processor, cause a system to perform operations comprising:

training a neural network system using first meta information associated with a training pair of a source language text and a target language translation, the first meta information indicating a first product category, a first topic, or both;

receiving, at the neural network system from a client device, an input text for an electronic commerce listing for an electronic commerce marketplace and second meta information corresponding to the input text, the second meta information indicating a second product category, a second topic, or both, associated with the electronic commerce listing;

generating, using the neural network system, a translation of the input text based at least in part on the second meta information; and outputting the electronic commerce listing comprising the translation of the input text for publication via the electronic commerce marketplace.

17. The non-transitory computer-readable medium of claim 16, wherein the input text is associated with a source language, and wherein the translation is associated with a target language, wherein the instructions are further executable by the processor to cause the system to perform operations comprising:

identifying a portion of the input text to keep in the source language, wherein generating the translation of the input text comprises refraining from translating the portion of the input text.

18. The non-transitory computer-readable medium of claim 17, wherein the portion of the input text comprises a number, a product specification, a brand name, or any combination thereof.

19. The non-transitory computer-readable medium of claim 16, wherein the instructions are further executable by the processor to cause the system to perform operations comprising:

generating one or more translated words associated with the input text based at least in part on the second product category, the second topic, or both, wherein the translation of the input text comprises the one or more translated words.

20. The non-transitory computer-readable medium of claim 16, wherein the input text comprises at least one source word in a source language which is translatable into two or more target words in a target language different from the source language, wherein the instructions are further executable by the processor to cause the system to perform operations comprising:

selecting a target word for the translation from the two or more target words of the target language based at least in part on the second meta information, wherein the translation of the input text comprises the selected target word.

* * * * *